US012575697B2

(12) United States Patent　　　(10) Patent No.:　US 12,575,697 B2

King　　　　　　　　　　　　　　　　(45) Date of Patent:　　Mar. 17, 2026

(54) OUTDOOR COOKING ASSEMBLY

(71) Applicant: Roderick King, Mobile, AL (US)

(72) Inventor: Roderick King, Mobile, AL (US)

( * ) Notice:　Subject to any disclaimer, the term of this patent is extended or adjusted under 35 U.S.C. 154(b) by 404 days.

(21) Appl. No.: 18/207,483

(22) Filed:　Jun. 8, 2023

(65)　　　　Prior Publication Data

US 2024/0407602 A1　　Dec. 12, 2024

(51) Int. Cl.
| | |
|---|---|
| *A47J 37/07* | (2006.01) |
| *A47J 36/32* | (2006.01) |
| *A47J 37/06* | (2006.01) |
| *F24B 1/20* | (2006.01) |
| *F24B 13/02* | (2006.01) |

(52) U.S. Cl.
CPC ........... *A47J 37/0786* (2013.01); *A47J 36/32* (2013.01); *A47J 37/067* (2013.01); *A47J 37/0704* (2013.01); *F24B 1/207* (2013.01); *F24B 13/02* (2013.01); *A47J 2202/00* (2013.01)

(58) Field of Classification Search
CPC ...... A47J 36/32; A47J 37/067; A47J 37/0704; A47J 37/0786; A47J 2202/00; F24B 1/207; F24B 13/02
See application file for complete search history.

(56)　　　　References Cited

U.S. PATENT DOCUMENTS

| | | | |
|---|---|---|---|
| 3,868,942 A | | 3/1975 | Lewis |
| 4,170,173 A | | 10/1979 | Bradford |

| | | | | |
|---|---|---|---|---|
| 4,572,062 A | | 2/1986 | Widdowson | |
| 4,665,891 A | * | 5/1987 | Nemec | A23B 4/052 |
| | | | | 126/25 R |
| 4,788,906 A | | 12/1988 | Starks | |
| 5,184,599 A | * | 2/1993 | Stuart | A47J 37/0704 |
| | | | | 126/41 D |
| D352,864 S | | 11/1994 | Parker | |
| 5,947,013 A | * | 9/1999 | Stewart, Jr. | A47J 37/0704 |
| | | | | 99/450 |
| 5,988,158 A | * | 11/1999 | Schmidt, Jr. | F24B 1/207 |
| | | | | 126/41 R |
| 6,125,836 A | | 10/2000 | Felton, Jr. | |
| 6,422,134 B1 | | 7/2002 | Barksdale | |
| 6,626,089 B1 | * | 9/2003 | Hubert | A47J 37/0713 |
| | | | | 99/482 |
| 7,156,087 B1 | * | 1/2007 | Churchill, III | A47J 37/0704 |
| | | | | 126/25 R |
| 8,726,896 B2 | | 5/2014 | Guillory | |
| D708,002 S | | 7/2014 | Cruccolini | |

(Continued)

FOREIGN PATENT DOCUMENTS

EP　　　　3235410　　　10/2017

*Primary Examiner* — Alfred Basichas

(57)　　　　ABSTRACT

An outdoor cooking assembly includes a barrel and a cooking support that is slidable into the barrel thereby facilitating the cooking support to support a food item for cooking. A fire pan is slidable into the barrel to contain a burning fuel to facilitate the cooking panel to cook the food item. A table is movably disposed on the barrel and the table is positionable between a deployed position and a stored position. A plurality of cooking panels is provided and a respective one of the cooking panels is positionable on the cooking support in the barrel to support the cooking pot for cooking a food item in the cooking pot. A cart is provided and each of the cooking panels is insertable into a respective one of a plurality of storage slots in the cart for storing the cooking panels.

13 Claims, 16 Drawing Sheets

(56) References Cited

U.S. PATENT DOCUMENTS

| 8,919,334 | B2 | 12/2014 | Glanville | |
| 2011/0011387 | A1* | 1/2011 | Sawaya ............... | A47J 37/0731 |
| | | | | 126/25 AA |
| 2020/0240643 | A1* | 7/2020 | Donnelly ........... | G05B 23/0262 |
| 2022/0196244 | A1* | 6/2022 | Hamilton ............ | A47J 37/0704 |

* cited by examiner

OUTDOOR COOKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cooking device and more particularly pertains to a new cooking device for facilitating food items to be cooked outdoors with a variety of cooking methods. The device includes a barrel and a fire pan that is insertable into the barrel for supporting a burning fuel. The device includes a shell curving upwardly from the barrel which has an entry to access an interior of the shell and a cooking panel that is slidable into the barrel for supporting a food item for cooking. The device includes a plurality of cooking supports that has an opening for insertably receiving a cooking pan and a respective one of the cooking supports can be positioned on the cooking panel. A cart is included which has a plurality of storage slots for storing the cooking panels.

(2) Description of Related Art Including Information Disclosed Under 37 CFR 1.97 and 1.98

The prior art relates to cooking devices including a variety of cooking devices that each at least includes a barrel that is horizontally oriented, a burn pan positioned in the barrel for holding a burning fuel and a grill disposed within the barrel for cooking a food item. The prior art discloses a cooking device that includes a barrel that is vertically oriented, a plurality of horseshoes attached to the barrel to define grips and a grill disposed in the barrel for cooking a food item. In no instance does the prior art disclose a barrel for cooking, a plurality of cooking supports with an aperture for receiving a cooking pot and a cart with a plurality of storage slots for storing the cooking supports.

BRIEF SUMMARY OF THE INVENTION

An embodiment of the disclosure meets the needs presented above by generally comprising a barrel and a cooking support that is slidable into the barrel thereby facilitating the cooking support to support a food item for cooking. A fire pan is slidable into the barrel to contain a burning fuel to facilitate the cooking panel to cook the food item. A table is movably disposed on the barrel and the table is positionable between a deployed position and a stored position. A plurality of cooking panels is provided and a respective one of the cooking panels is positionable on the cooking support in the barrel to support the cooking pot for cooking a food item in the cooking pot. A cart is provided and each of the cooking panels is insertable into a respective one of a plurality of storage slots in the cart for storing the cooking panels.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
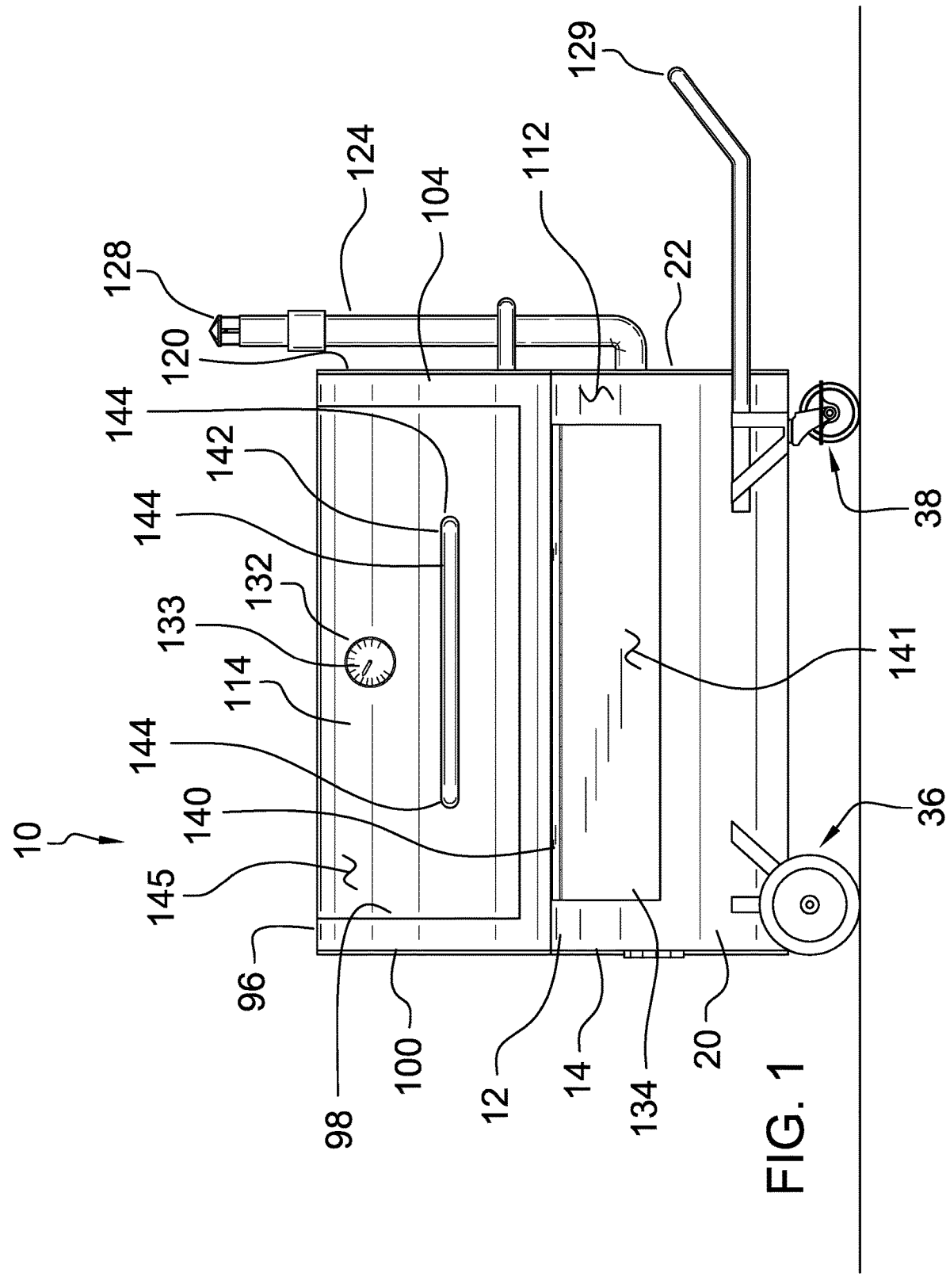
FIG. 1 is a right side view of a outdoor cooking assembly according to an embodiment of the disclosure.
Figure 2:
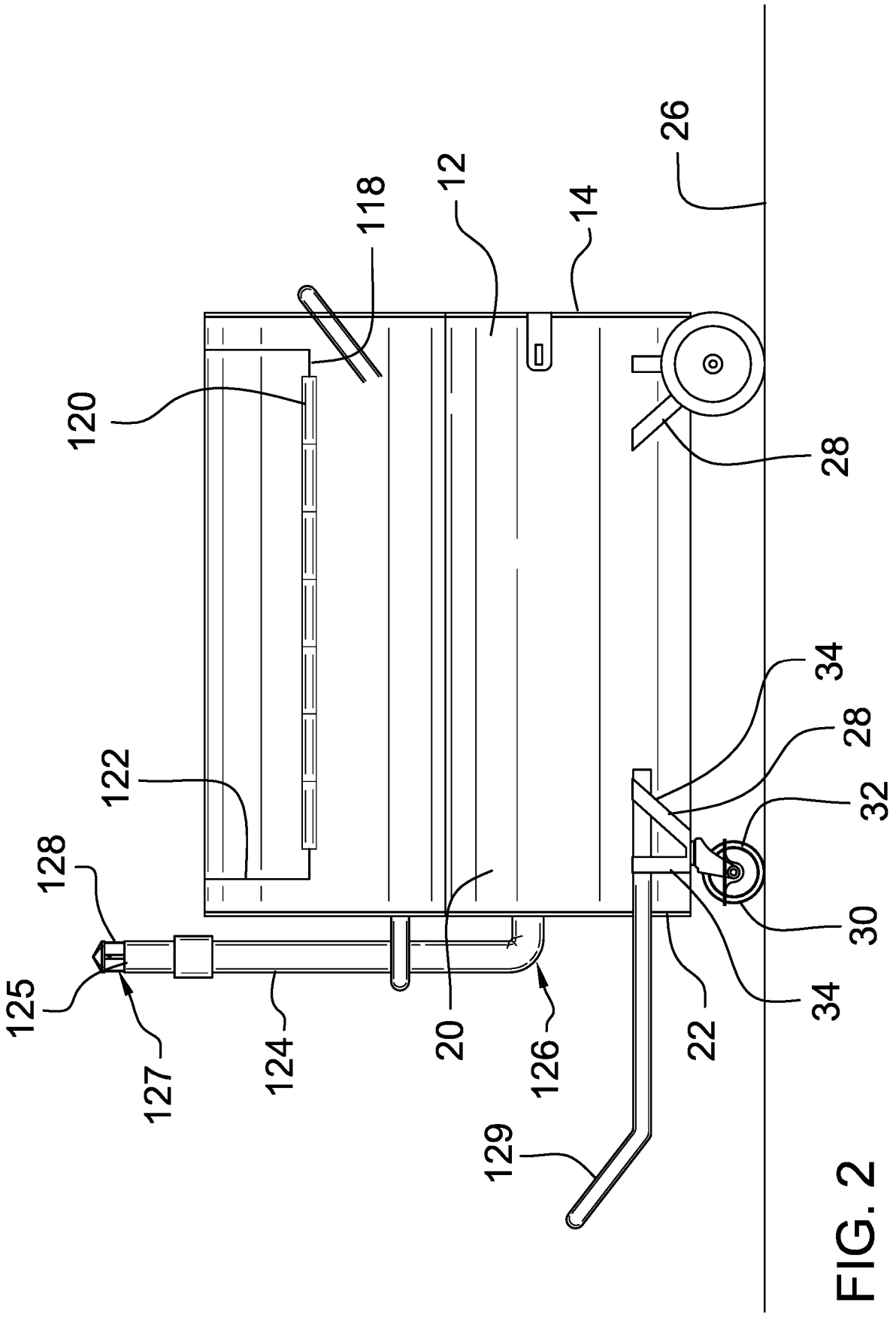
FIG. 2 is a left side view of an embodiment of the disclosure.
Figures 3, 4:
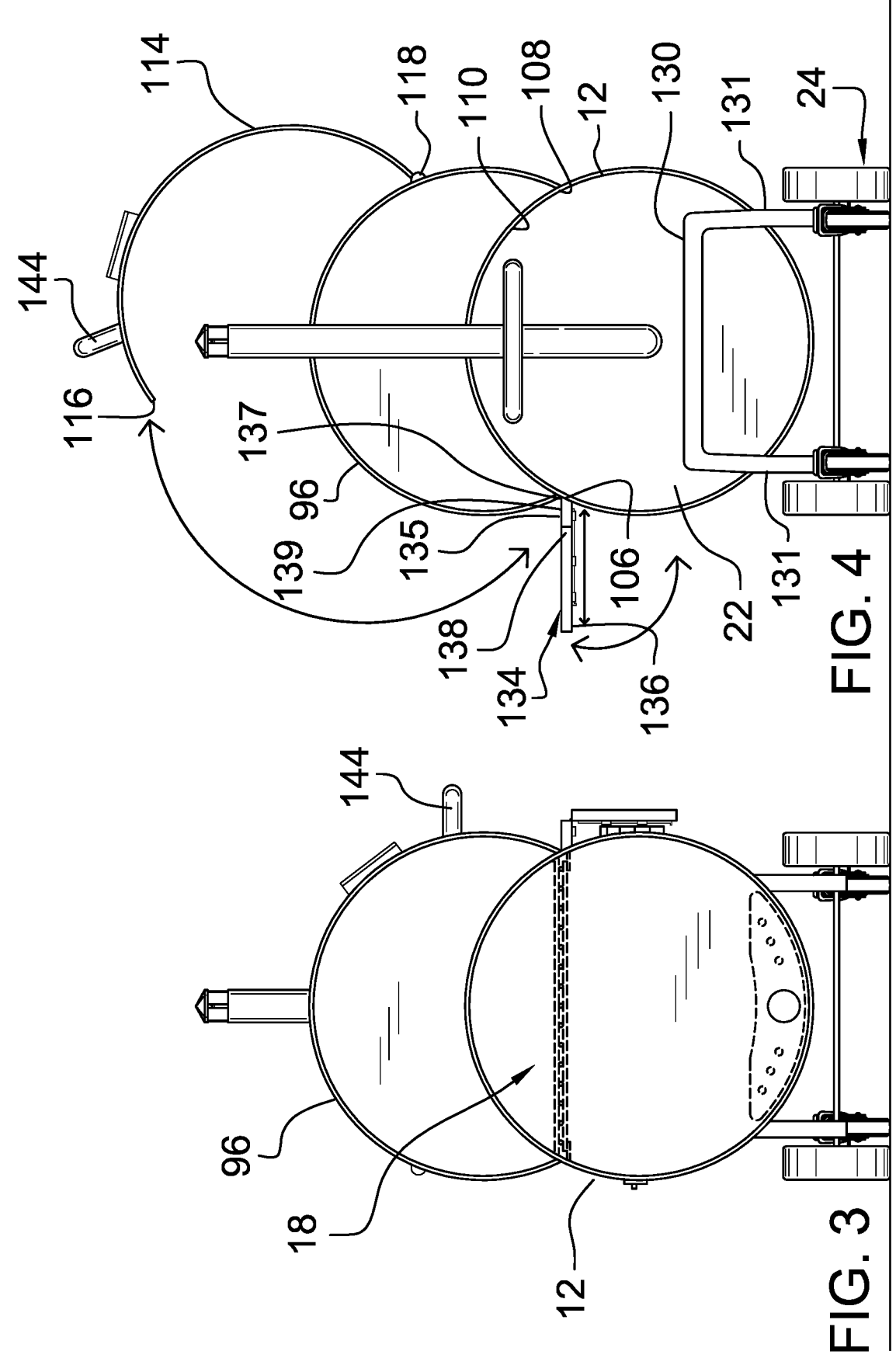
FIG. 3 is a back phantom view of an embodiment of the disclosure.
FIG. 4 is a front view of an embodiment of the disclosure.
Figure 5:
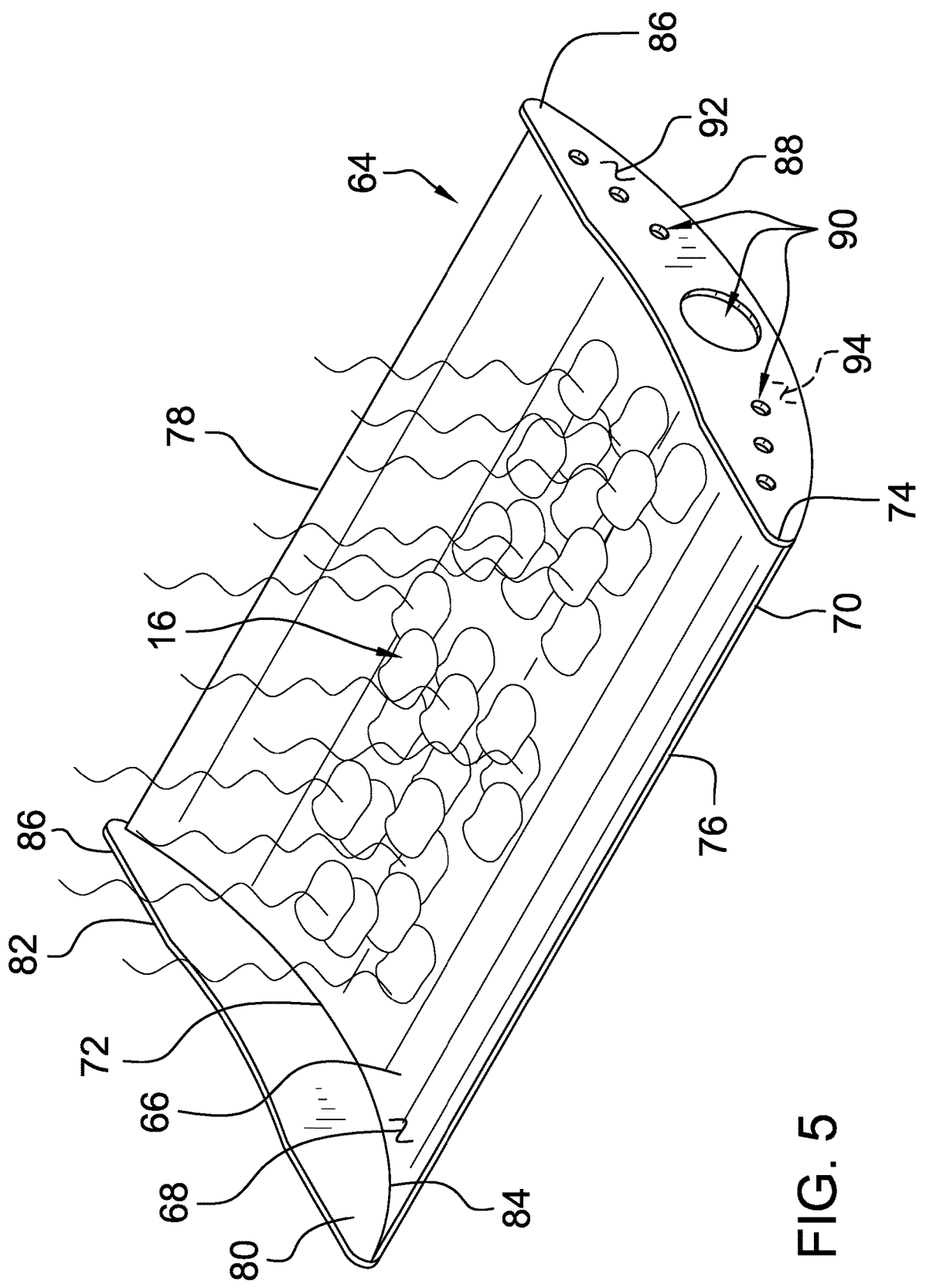
FIG. 5 is a perspective view of a fire pan of an embodiment of the disclosure.
Figure 6:
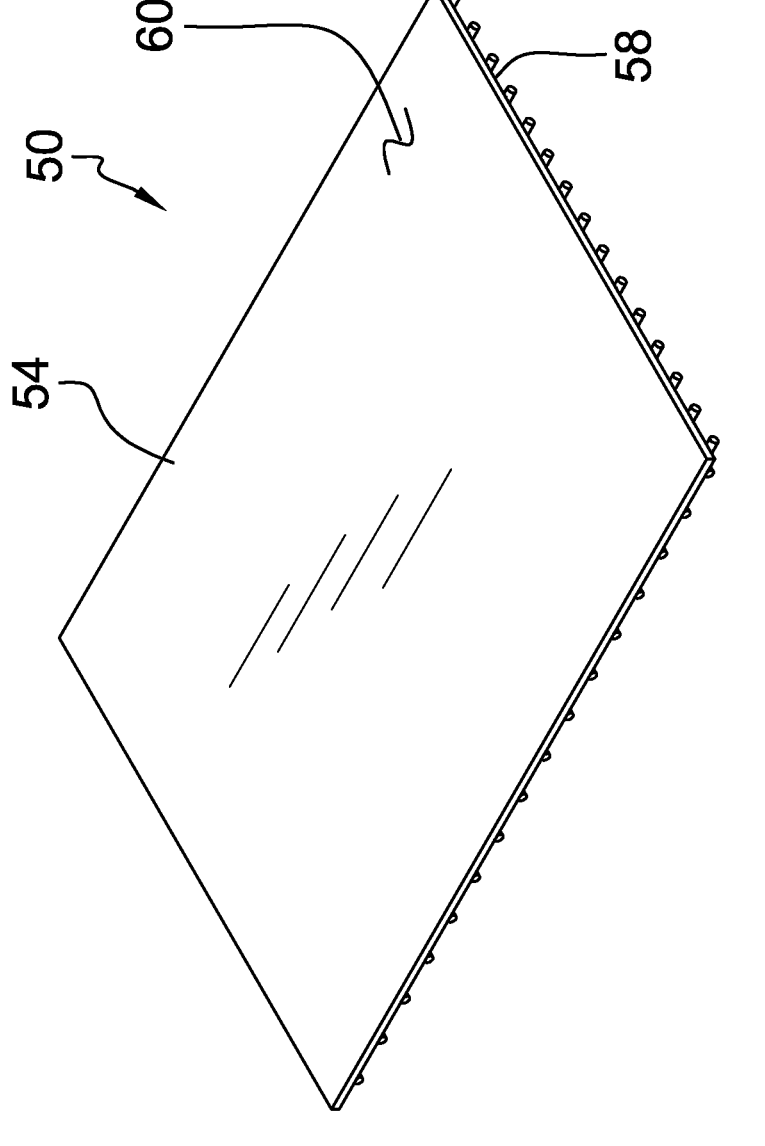
FIG. 6 is a bottom perspective view of a cooking support of an embodiment of the disclosure.
Figure 7:
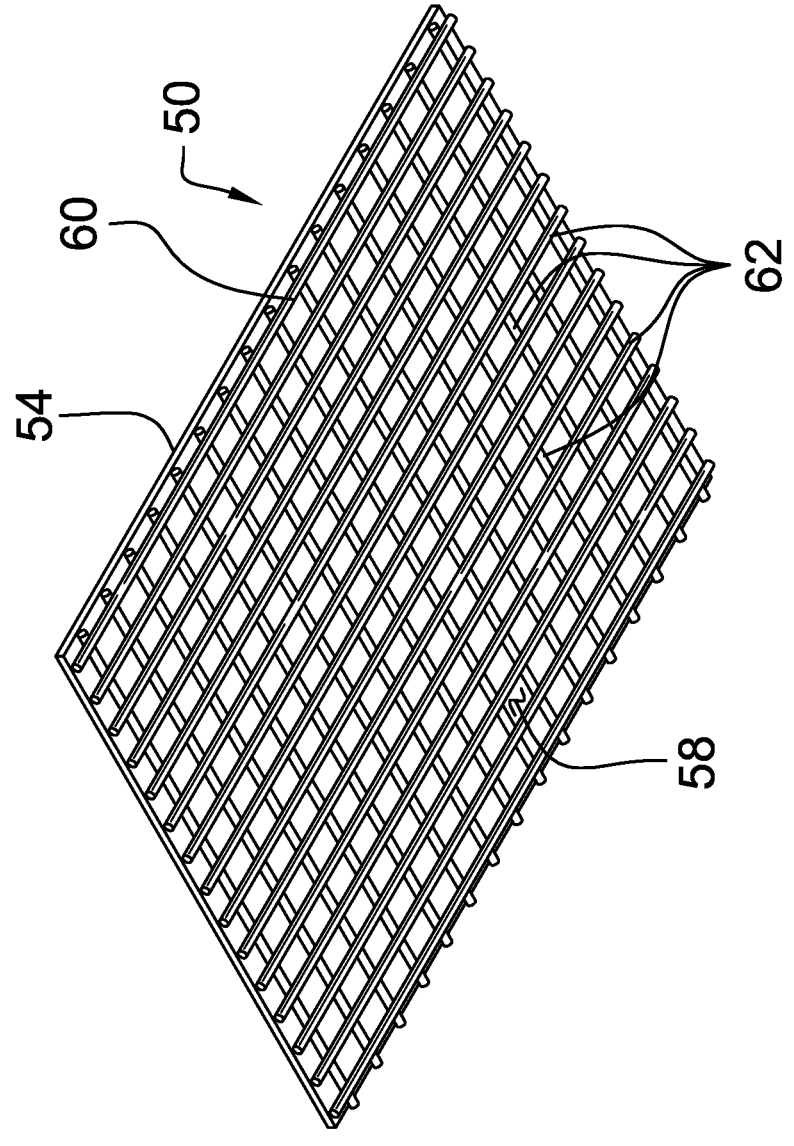
FIG. 7 is a top perspective view of a cooking support of an embodiment of the disclosure.
Figure 8:
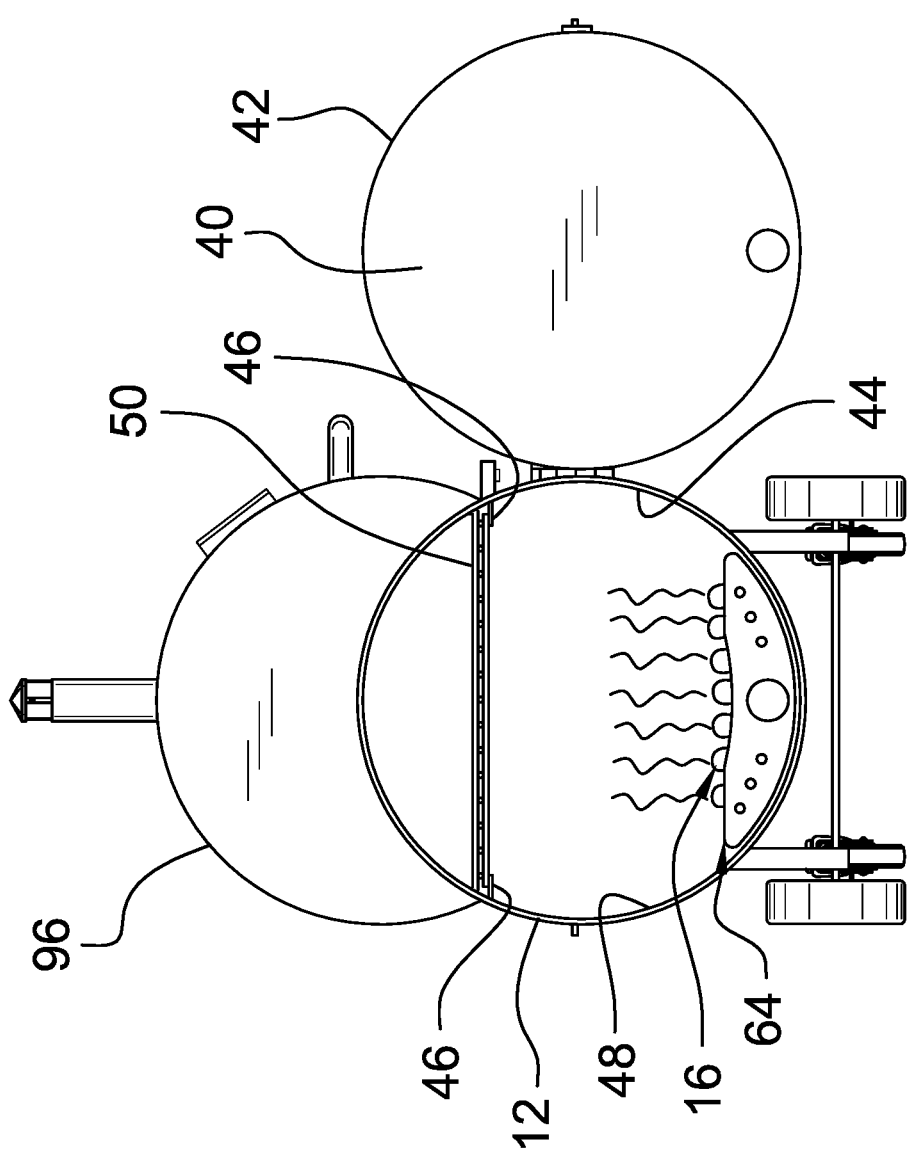
FIG. 8 is a back view of an embodiment of the disclosure showing a rear door of a barrel being opened.
Figure 9:
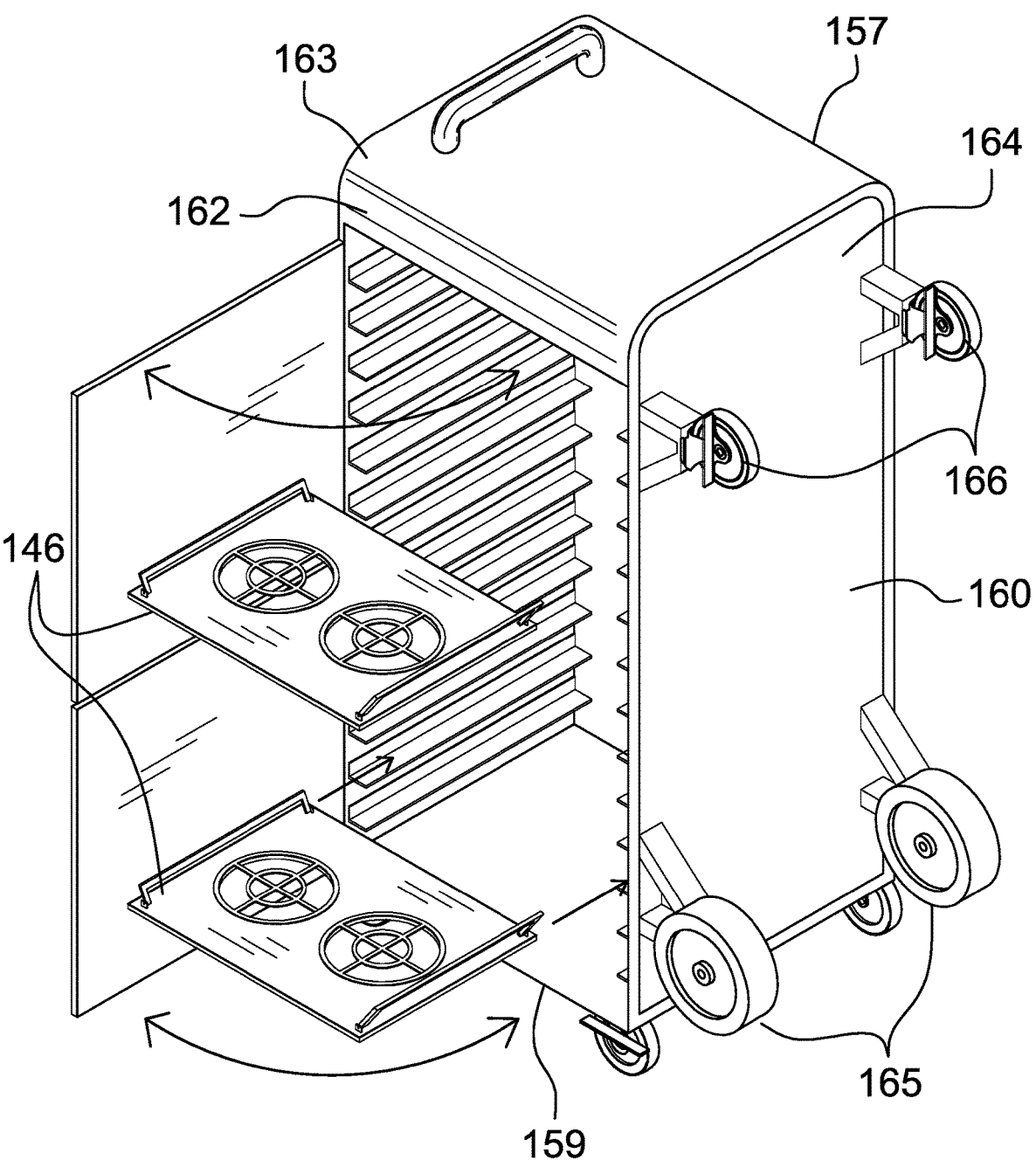
FIG. 9 is a perspective view of a cart of an embodiment of the disclosure.
Figure 10:
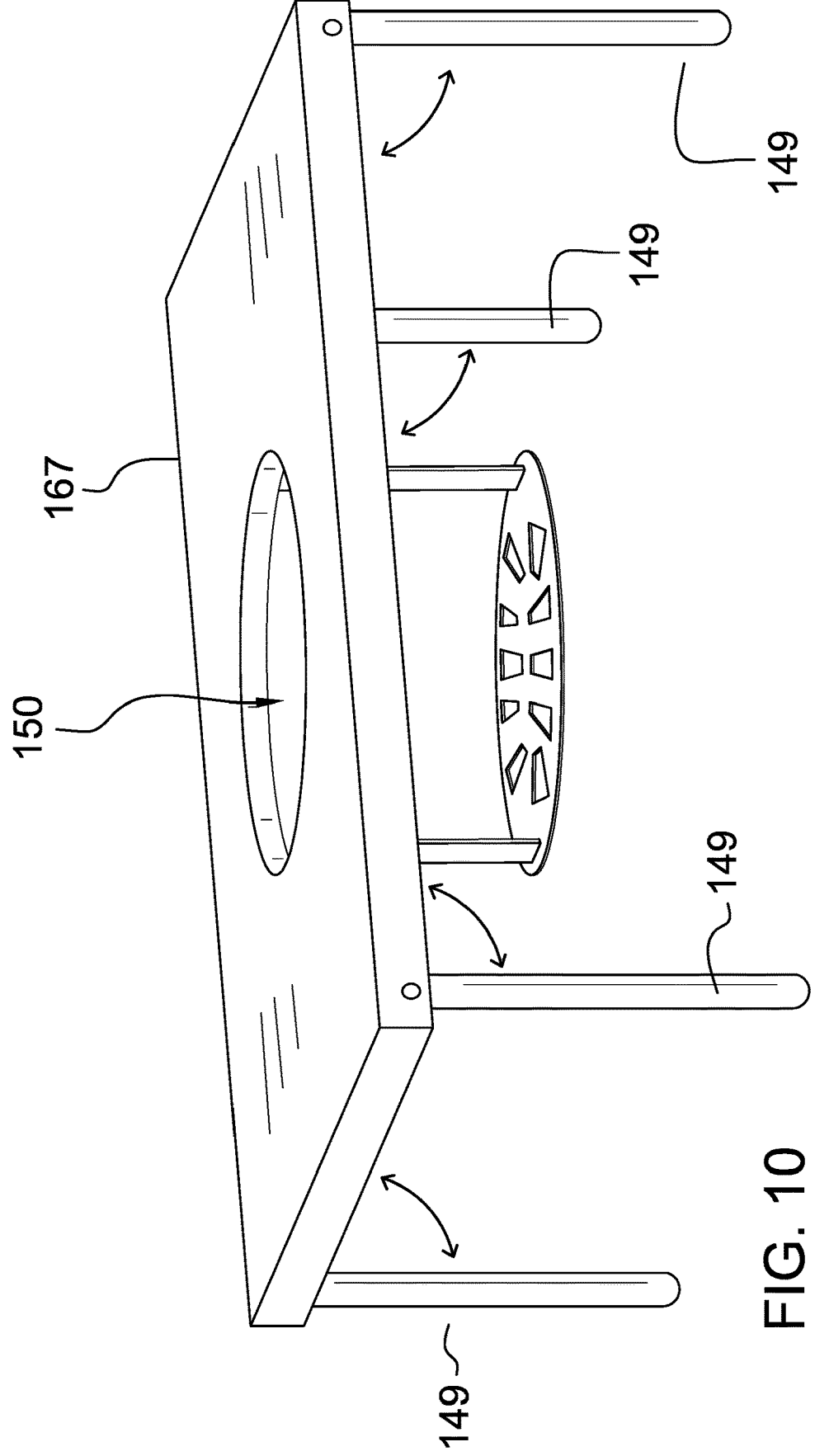
FIG. 10 is a perspective view of a cooking panel of an embodiment of the disclosure.
Figure 11:
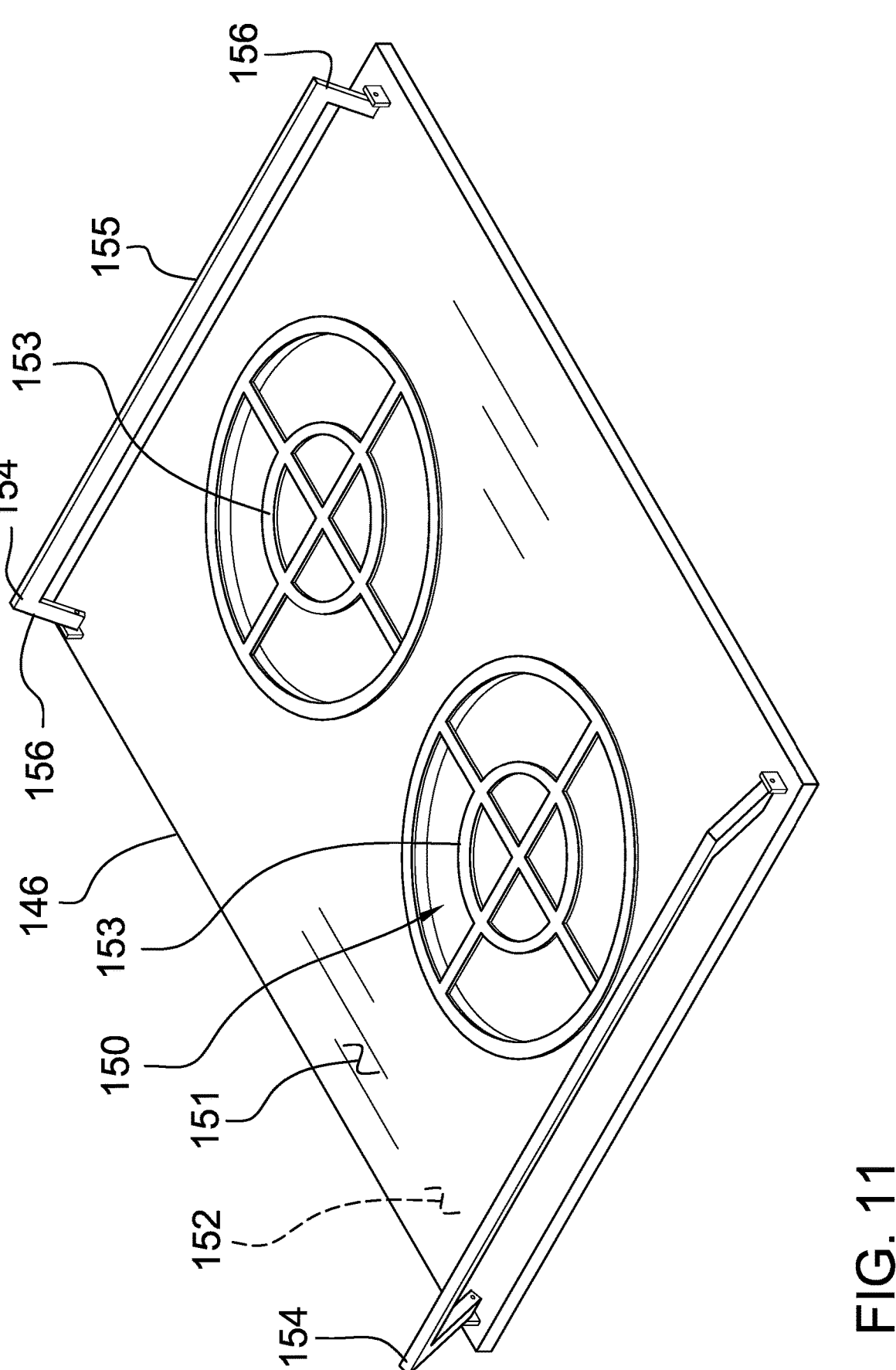
FIG. 11 is a top perspective view of a cooking panel of an embodiment of the disclosure.
Figure 12:
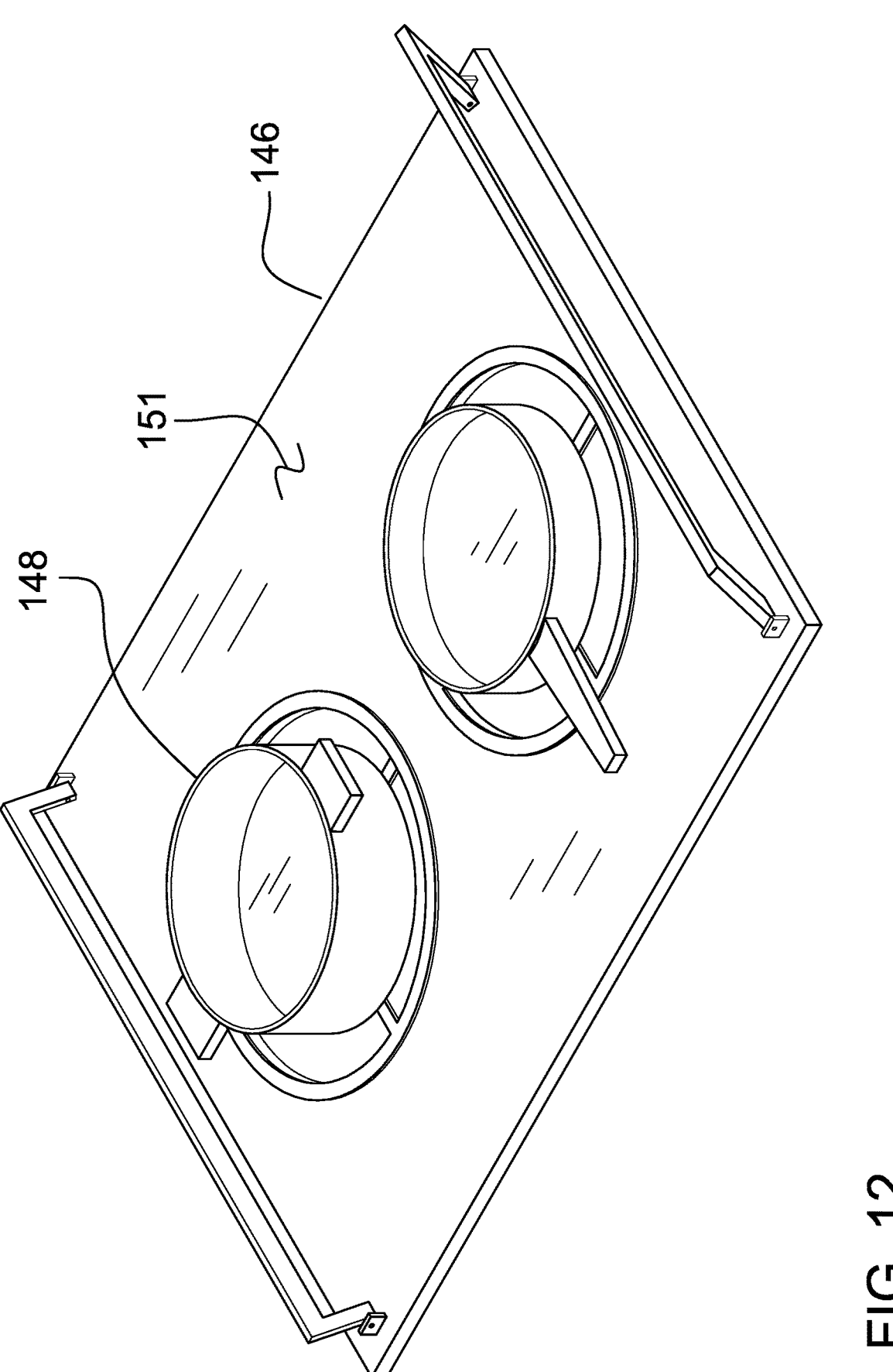
FIG. 12 is perspective in-use view of a cooking panel of an embodiment of the disclosure.

With reference now to the drawings, and in particular to FIGS. 1 through 17 thereof, a new cooking device embodying the principles and concepts of an embodiment of the disclosure and generally designated by the reference numeral 10 will be described.

As best illustrated in FIGS. 1 through 17, the outdoor cooking assembly 10 generally comprises a barrel 12 that has a rear end 14 which is open to access an interior of the barrel 12 and the barrel 12 is comprised of a heat resistant material thereby facilitating the barrel 12 to contain a burning fuel 16. The burning fuel 16 may comprise wood, charcoal briquettes or any other type of combustible material that is commonly employed in the tradition of barbequing food items. The barrel 12 is oriented to extend along a horizontal axis and the barrel 12 has an opening 18 extending through an outer wall 20 of the barrel 12. Furthermore, the opening 18 extends substantially between the rear end 14 of the barrel 12 and a forward end 22 of the barrel 12 and the barrel 12 is oriented such that the opening 18 faces upwardly.

A plurality of rollers 24 is each rotatably disposed on the barrel 12 thereby facilitating the rollers 24 to roll along a support surface 26. Each of the rollers 24 includes a mount 28 that is attached to the outer wall 20 of the barrel 12 and a wheel 30 that rotatably coupled to a distal end 32 of the mount 28 with respect to the outer wall 20 of the barrel 12. The mount 28 associated with each of the rollers 24 might include a pair of members 34 that intersect each other at point being distally located with respect to the outer wall 20 of the barrel 12. Furthermore, the wheel 30 associated with each of the rollers 24 may be disposed on the point at which the members 34 of the associated roller 24 intersect. The plurality of rollers 24 includes a set of rear rollers 36 and a set of front rollers 38. Each of the rear rollers 24 is positioned adjacent to the rear end 14 of the barrel 12 and each of the front rollers 38 is positioned adjacent to the forward end 22 of the barrel 12. The wheel 30 associated with each of the front rollers 38 is pivotally attached to the distal end 32 of the mount 28 associated with a respective one of the front rollers 24 such that the wheel 30 associated with each of the front rollers 24 pivots about a vertical axis thereby facilitating the barrel 12 to be steered.

A rear door 40 is hingedly coupled to the rear end 14 of the barrel 12 for opening 18 and closing the rear end 14. The rear door 40 has a perimeter edge 42 that is continuously arcuate about a center point of the rear door 40 such that the rear door 40 has a circular shape. Additionally, the perimeter edge 42 is hingedly coupled to a bounding edge 44 of the rear end 14 at a hinge point located on the perimeter edge 42. The perimeter edge 42 is continuously arcuate about a center point of the rear door 40 such that the rear door 40 has a circular shape.

A pair of tracks 46 is each attached to an inside surface 48 of the outer wall 20 of the barrel 12 and each of the tracks 46 extends between the rear end 14 of the barrel 12 and the forward end 22 of the barrel 12. Each of the tracks 46 is positioned on opposite sides of the barrel 12 with respect to each other and each of the tracks 46 is spaced upwardly from a center of the barrel 12. A cooking support 50 is provided and the cooking support 50 is slidable into the barrel 12 thereby facilitating the cooking support 50 to support a food item 52 for cooking. The cooking support 50 comprises a panel 54 that has a top surface 56 and a bottom surface 58 and the panel 54 is comprised of a rigid material to support the food item 52. Furthermore, the panel 54 is comprised of a heat resistant material such that the panel 54 can be heated by the burning fuel 16.

The cooking support 50 includes a grill 60 comprising a plurality of intersecting members 62 arranged to form a grid and the grill 60 is bonded to the bottom surface 58 of the panel 54 such that the grill 60 completely covers the bottom surface 58. The cooking support 50 is slidable onto each of the tracks 46 having the top surface 56 of the panel 54 resting on the tracks 46 when the cooking support 50 is positioned in a first orientation thereby facilitating the food item 52 to be positioned on the grill 60. The cooking support 50 is positionable in a second position such that grill 60 rests on the tracks 46 thereby facilitating the food item 52 to be positioned on the bottom surface 58 of the panel 54.

A fire pan 64 is provided and the fire pan 64 is slidable into the barrel 12. The fire pan 64 is comprised of a heat resistant material thereby facilitating the fire pan 64 to contain the burning fuel 16. The fire pan 64 is positioned below the cooking panel 54 when each of the fire pan 64 and the cooking panel 54 are positioned in the barrel 12. In this way the cooking panel 54 can be heated by the burning fuel 16 to cook the food item 52. The fire pan 64 comprises a lower plate 66 that has an upper surface 68 and a perimeter edge 70; the perimeter edge 70 has a front side 72, a back side 74, a first lateral side 76 and a second lateral side 78. The upper surface 68 is concavely arcuate between the first lateral side 76 and the second lateral side 78 thereby facilitating the lower plate 66 to conform to curvature of the inside surface 48 of the outer wall 20 of the barrel 12 such that the upper surface 68 can contain the burning fuel 16.

The fire pan 64 includes a first end plate 80 that is attached to the front side 72. The first end plate 80 has an upper edge 82 extending between the first lateral side 76 and the second lateral side 78 and the first end plate 80 has a lower edge 84 that is co-arcuate with the upper surface 68. The fire pan 64 includes a second end plate 86 that is attached to the back side 74. The second end plate 86 has an upper edge 87 extending between the first lateral side 76 and the second lateral side 78 and the second end plate 86 has a lower edge 88 that is co-arcuate with the upper surface 68. The second end plate 86 has a plurality of holes 90 each extending through a first surface 92 and a second surface 94 of the second end plate 86 to pass air onto the burning fuel 16 to support combustion of the burning fuel 16.

A shell 96 is attached to and curves upwardly from the barrel 12 and the shell 96 is in fluid communication with an interior of the barrel 12 such that the shell 96 contains heat produced by the burning fuel 16 in the fire pan 64. Additionally, the shell 96 has an entry 98 extending through the shell 96 for accessing the cooking support 50. The shell 96 has a front end 100, a back end 102 and an exterior wall 104 extending between the front end 100 and the back end 102 and the exterior wall 104 has a first edge 106 and a second edge 108 each extending between the front end 100 and the back end 102. The exterior wall 104 is concavely arcuate between the first edge 106 and the second edge 108 and each of the front end 100 and the back end 102 has a lower edge 110. The lower edge 110 of each of the front end 100 and the back end 102 is concavely arcuate between the first edge 106 and the second edge 108.

Each of the first edge 106 and the second edge 108 is coupled to an outer surface 112 of the exterior wall 104 of the barrel 12 such that the shell 96 surrounds the opening 18 in the outer wall 20 of the barrel 12. The lower edge 110 of each of the front end 100 and the back end 102 is coupled to the outer surface 112 of the exterior wall 104 of the barrel 12. The lower edge 110 of each of the front end 100 and the back end 102 is aligned with a respective one of the rear end 14 and the forward end 22 of the barrel 12. The entry 98 extends through the exterior wall 104 and the entry 98 extends substantially between the front end 100 and the back end 102.

A top door 114 is hingedly coupled to the shell 96, the top door 114 is aligned with the entry 98 for opening 18 and closing the entry 98 and the top door 114 has a front edge 116 and a rear edge 118. The top door 114 is concavely arcuate between the front edge 116 and the rear edge 118 and the rear edge 118 is hingedly coupled to a lateral side 120 of a bounding edge 122 of the entry 98. A stove pipe 124 is coupled to the barrel 12 such that the stove pipe 124 is in fluid communication with an interior of the barrel 12 to exhaust smoke from the burning fuel 16 from the barrel 12. The stove pipe 124 is coupled to the forward end 22 of the barrel 12 and the stove pipe 124 has a distal end 125 with respect to the forward wall. The stove pipe 124 has a bend 126 integrated into the stove pipe 124 thereby defining an upright portion 127 of the stove pipe 124 extending upwardly along the forward end 22 of the barrel 12 such that the distal end 125 of the stove pipe 124 is elevated above the shell 96. The stove pipe 124 has a diffuser 128 that is integrated into the distal end 125 of the stove pipe 124 for diffusing the exhaust smoke.

A pull handle 129 is coupled to the barrel 12 thereby facilitating the pull handle 129 to be gripped for transporting the barrel 12 along the support surface 26. The pull handle 129 comprises a central member 130 extending between a pair of outward members 131 and each of the outward members 131 is coupled to the outer wall 20 of the barrel 12 having each of the outward members 131 extending forwardly beyond the forward end 22 of the barrel 12. Each of the outward members 131 bends upwardly at a point located adjacent to the central member 130 thereby elevating the central member 130 above the support surface 26 for facilitating the central member 130 to be gripped for transporting the barrel 12.

A temperature sensor 132 provided and the temperature sensor 132 is integrated into the shell 96. The temperature sensor 132 is in thermal communication with an interior of the shell 96 thereby facilitating the temperature sensor 132 to detect a temperature of the interior of the shell 96. The temperature sensor 132 includes a gauge 133 that is positioned on the exterior wall 104 of the shell 96 for displaying the temperature of the interior of the shell 96. The temperature sensor 132 may comprise an analog thermometer which as an operational range which ranges between approximately 50.0 degrees Fahrenheit and 400.0 degrees Fahrenheit.

A table 134 is movably disposed on the barrel 12 and the table 134 is positionable between a deployed position and a stored position. The table 134 includes a first panel 135 attached to the barrel 12 and a second panel 136 hingedly attached to the first panel 135 of the table. The first panel 135 of the table 134 has a rear edge 137, a front edge 138 and an upper surface 139 extending between the rear edge 137 and the front edge 138 and the rear edge 137 is coupled to the outer wall 20 of the barrel 12. The second panel 136 of the table 134 has a back edge 140 and a top surface 141 and the back edge 140 is hingedly coupled to the front edge 138 of the first panel 135 of the table 134. The top surface 141 of the of the second panel 136 of the table 134 lies on a plane that is oriented coplanar with the upper surface 139 of the first panel 135 of the table 134 when the table 134 is in the deployed position. Conversely, the second panel 136 of the table 134 extends downwardly from the first panel 135 of the table 134 when the table 134 is in the stored position.

An opening handle 142 is attached to the top door 114 for opening and closing the top door 114 and the opening handle 142 includes a middle member 143 extending between a pair of sidelong members 144. Each of the sidelong members 144 is attached to and extends away from an outer surface 145 of the top door 114 having the middle member 143 being spaced from and extending along the outer surface 145 thereby facilitating the middle member 143 to be gripped.

A plurality of cooking panels 146 is provided and each of the cooking panels 146 has a pair of holders 147 for holding a respective type of cooking pot 148. A respective one of the cooking panels 146 is positionable on the cooking support 50 in the barrel 12 thereby facilitating the food item 52 contained in the cooking pot 148 positioned on the respective cooking panel 54 to be cooked. Each of the cooking panels 146 has an opening 150 extending through a top surface 151 and a bottom surface 152 of the cooking panel 54 to accommodate the cooking pot 148. A plurality of support brackets 153 is each attached to a respective one of the cooking panels 146 for supporting the cooking pot 148 positioned on the respective cooking panel 146. Additionally, each of the support brackets 153 is aligned with the opening 150 in the respective cooking panel 146.

Each of the cooking panels 146 includes a pair of panel handles 154 that each has a middle member 155 extending between a pair of end members 156. Each of the end members 156 of each of the panel handles 154 is hingedly attached to the top surface 151 of a respective cooking panel 146 thereby facilitating the middle member 155 to be gripped. In this way the cooking panels 146 can be carried. As is most clearly shown in FIG. 10, the plurality of cooking panels 146 includes a recessed panel 167 that includes a pair of supports 169 that each extends downwardly from bottom surface 152 of the recessed panel 167. The support bracket 153 associated with the recessed panel 167 is attached to a distal end 170 of each of the supports 169 thereby facilitating a stock pot, for example, to be positioned in the recessed panel 167. A plurality of legs 149 is each pivotally coupled to the recessed panel 167 to support the recessed panel 167 above the cooking support 50 for accommodating the depth of the stock pot.

A cart 157 is provided which has a plurality of storage slots 158 is integrated into the cart 157. Each of the cooking panels 146 is insertable 134 into a respective one of the storage slots 158 for storing the cooking panels 146. The cart 157 has a bottom wall 159 and an outer wall 160 extending upwardly from a bottom wall 161. The outer wall 160 of the cart 157 has a first lateral side 162 that is open, a front side 163 and a back side 164. A plurality of first rollers 165 is each rotatably attached to the bottom wall 161 of the cart 157 for rolling along the support surface 26 and a plurality of second rollers 166 is each rotatably attached to the back side 164 of the outer wall 20 for rolling the cart 157 along the support surface 26. In this way the cart 157 can either be stood upon the first rollers 24 or the second rollers 24. Additionally, a cart door 167 is hingedly coupled to the outer wall 20 for opening 18 or closing the first lateral side.

Figure 13:
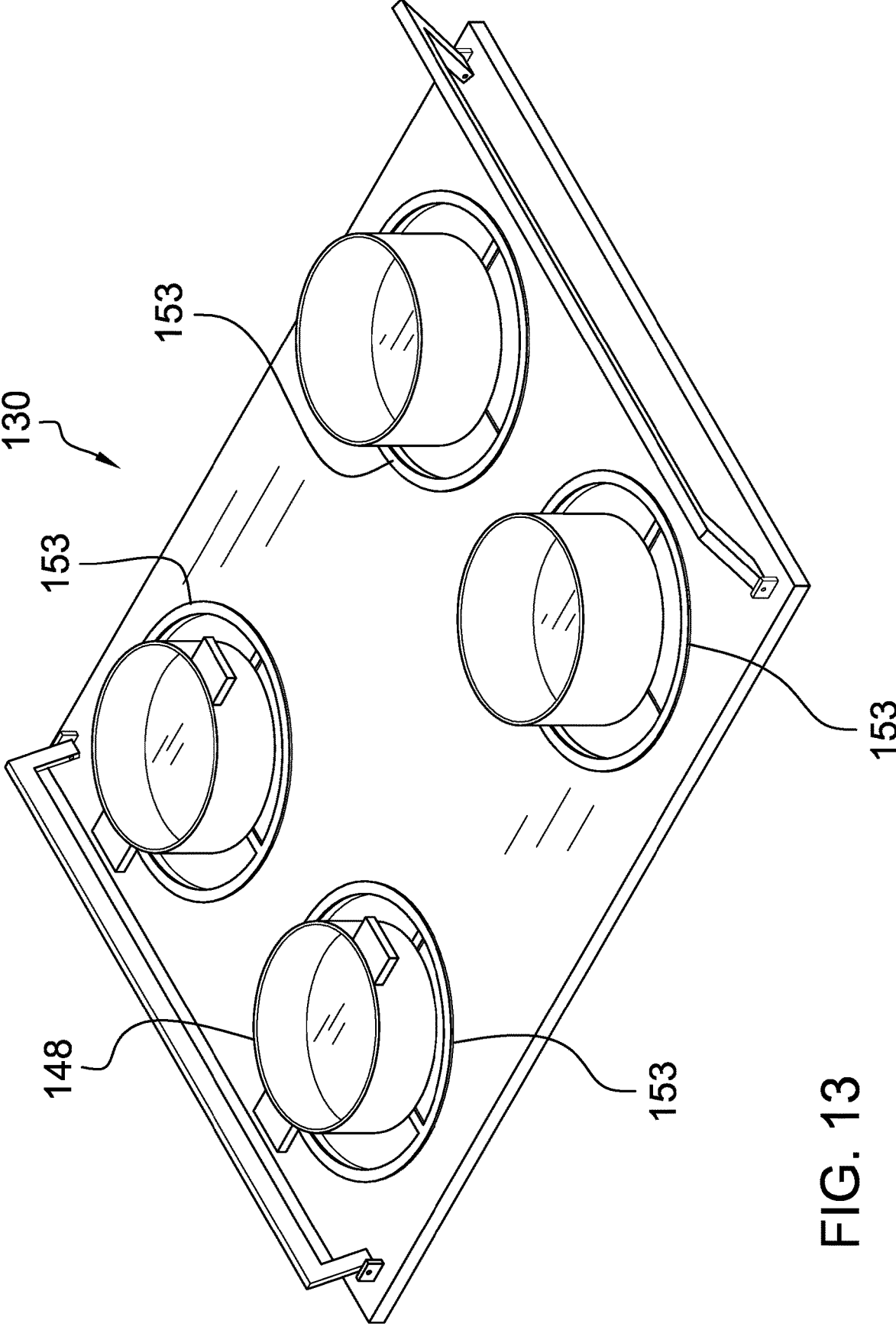
FIG. 13 is a perspective view of a multiple pot cooking panel of an embodiment of the disclosure.
Figure 14:
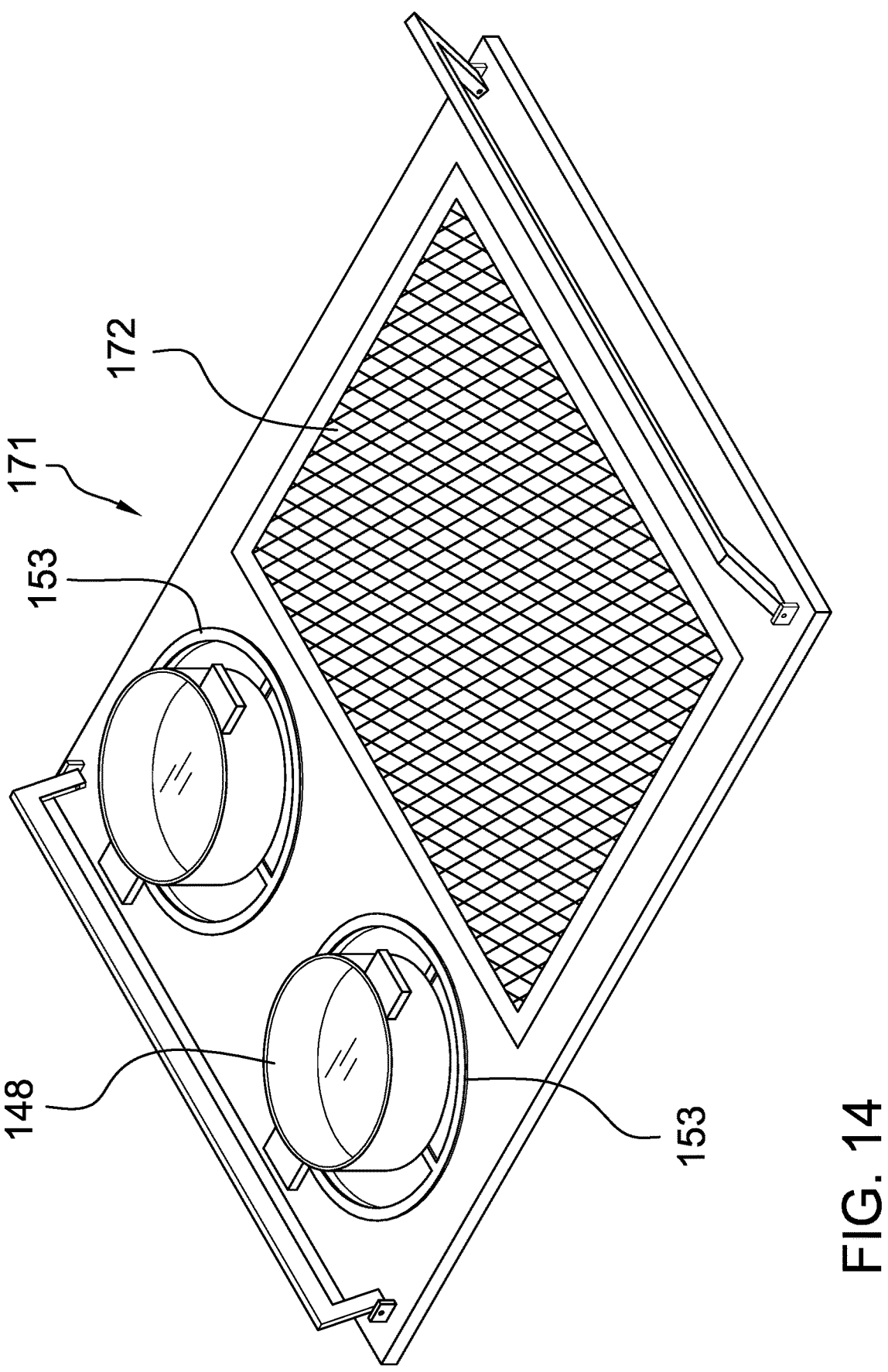
FIG. 14 is a perspective view of a combination panel of an embodiment of the disclosure.
Figure 15:
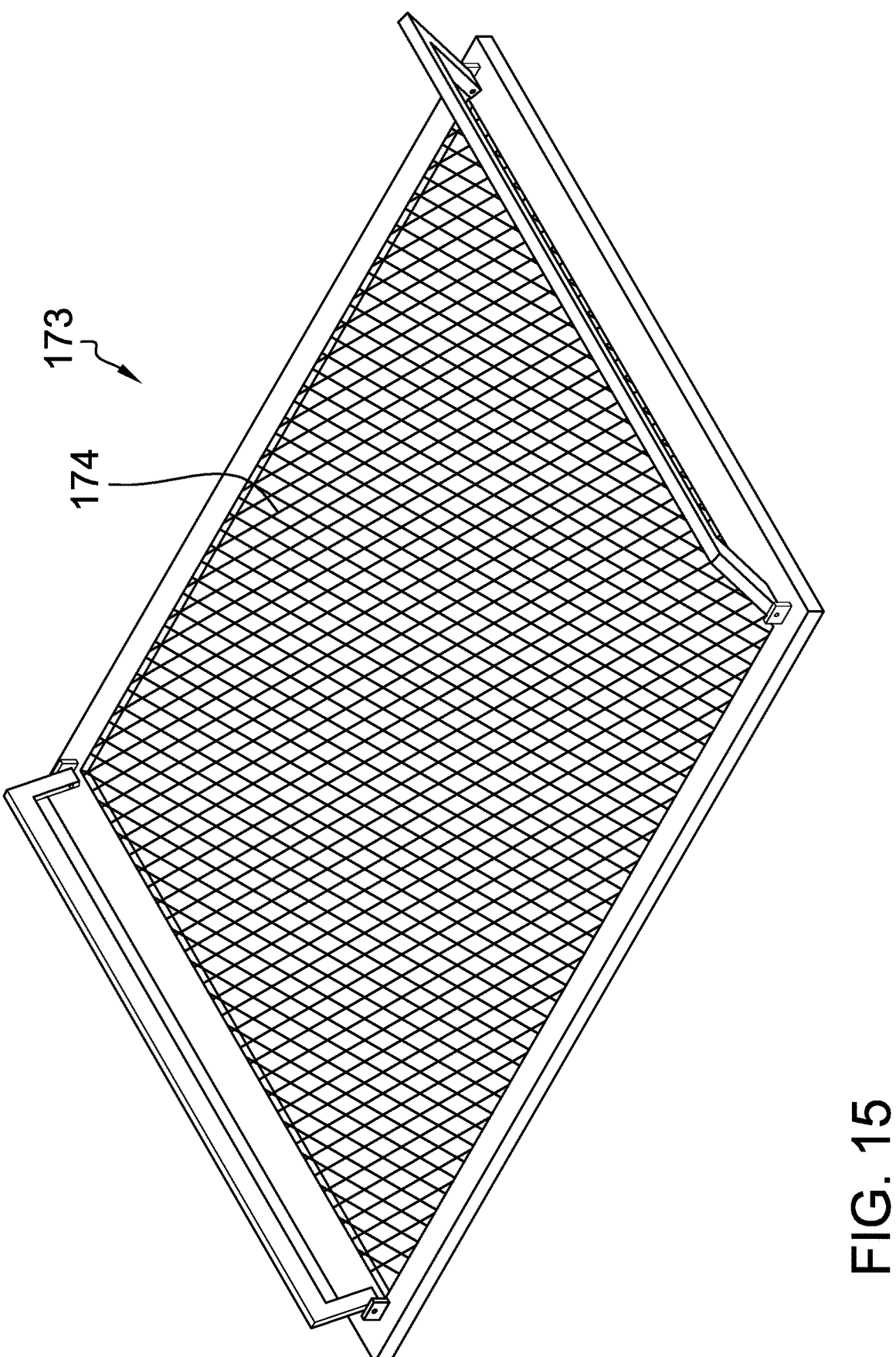
FIG. 15 is a perspective view of a grill panel of an embodiment of the disclosure.
Figure 16:
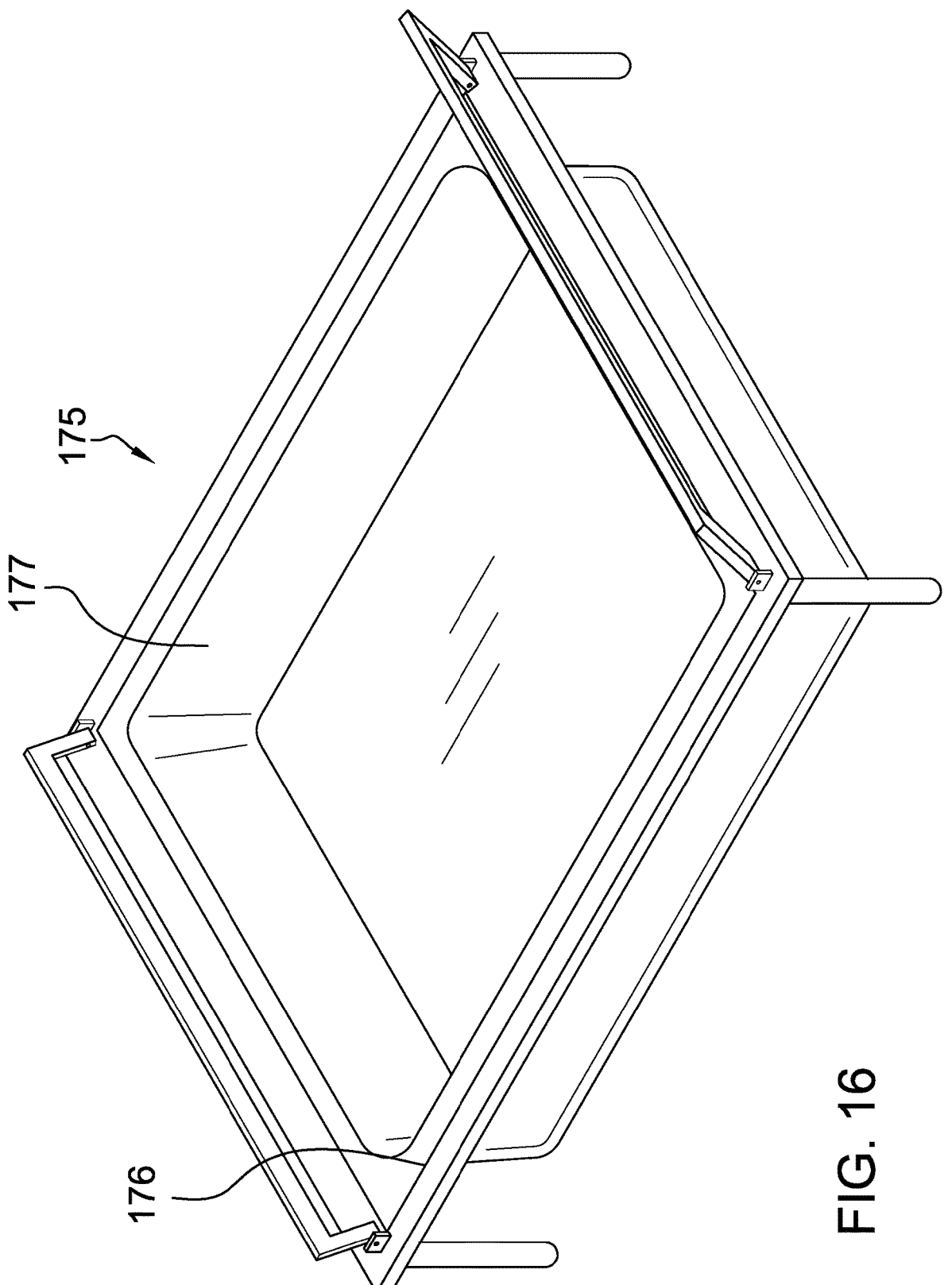
FIG. 16 is a perspective view of a pan panel of an embodiment of the disclosure.
Figure 17:
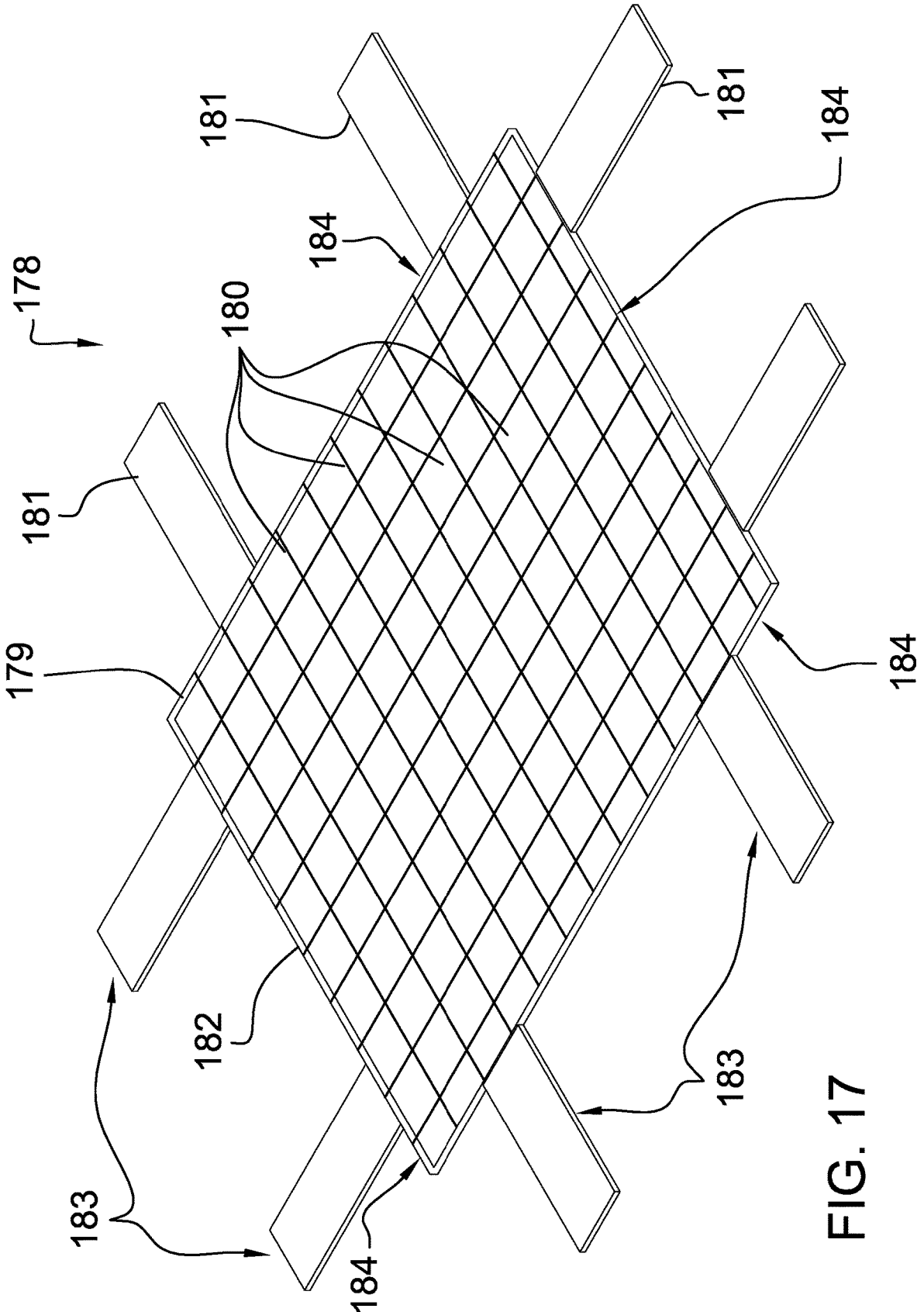
FIG. 17 is a perspective view of a baking panel of an embodiment of the disclosure.

As is shown in FIG. 13, the plurality of cooking panels 146 includes a multiple cooking pot panel 170 which includes a plurality of the support brackets 153 for supporting a plurality of cooking pots 148. As shown in FIG. 14, the plurality of cooking panels 146 includes a combination panel 171 which includes a pair of support brackets 153 to support a pair of cooking pots 148 and a grill rack 172 integrated into the combination panel 171 for supporting a meat product, such as a whole chicken or a rack of ribs. As shown in FIG. 15, the plurality of cooking panels 146 includes a grill panel 173 that includes a grill rack 174 integrated into the grill panel 173 that has a length and a width sufficient to accommodate at least four whole chickens or four racks of ribs. As shown in FIG. 16, the plurality of cooking panels 146 includes a pan panel 175 which has an opening 176 extending through the cooking panel 54 of the pan panel 175 which can insertably receive a large baking pan 177. As shown in FIG. 17, the plurality of cooking panels 146 includes a baking panel 178 that includes a baker's rack 179 which comprising a grid of intersecting members 180 and a plurality of flattened bars 181 which each extends away from a perimeter edge 182 of the baker's rack 177. The flattened bars 181 are arranged into a plurality of pairs of flattened bars 183 which are each positioned on a respective one of a plurality of intersecting sides 184 of the perimeter edge 182 of the baker's rack 179.

In use, the burning fuel 16 is placed on the fire pan 64 and the burning fuel 16 is ignited to heat the interior of the barrel 12 and the shell 96. The cooking grill 60 is positioned in the first orientation and the food item(s) 52 to be cooked is placed on the cooking grill 60 to cook the food item(s) 52 in the convention of grilling. Conversely, the cooking grill 60 is positioned in the second orientation and the food item(s) 52 are positioned on the panel 54 to cook the food item(s) 52 in the convention of frying. Additionally, a selected one of the cooking panels 146 is placed on the tracks 46 in lieu of the cooking grill 60 to facilitate food item(s) 52 contained in cooking pot(s) 148 to be cooked. In this way the barrel 12 facilitates the food item(s) 52 to be cooked in nearly any conceivable way that would typically be associated with cooking in a kitchen. Furthermore, the cooking panels 146 are stored in the cart 157 when the cooking panels 146 are not being employed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An outdoor cooking assembly for facilitating food to be cooked in a variety of methods, said assembly comprising:
a barrel having a rear end being open to access an interior of said barrel, said barrel being comprised of a heat resistant material thereby facilitating said barrel to contain a burning fuel, said barrel being oriented to extend along a horizontal axis;
a plurality of rollers, each of said rollers being rotatably disposed on said barrel wherein said rollers are configured to roll along a support surface;
a cooking support being slidable into said barrel thereby facilitating said cooking support to support a food item for cooking;
a fire pan being slidable into said barrel, said fire pan being comprised of a heat resistant material wherein said fire pan is configured to contain the burning fuel, said fire pan being positioned below said cooking panel when each of said fire pan and said cooking panel are positioned in said barrel thereby facilitating said cooking panel to be heated by the burning fuel wherein said fire pan is configured to facilitate said cooking panel to cook the food item;
a shell being attached to and curving upwardly from said barrel, said shell being in fluid communication with an interior of said barrel wherein said shell is configured to contain heat produced by the burning fuel in said fire pan, said shell having an entry extending through said shell for accessing said cooking support; and
a table being movably disposed on said barrel, said table being positionable between a deployed position and a stored position.

2. The assembly according to claim 1, wherein said fire pan comprises:
a lower plate having an upper surface and a perimeter edge, said perimeter edge having a front side, a back side, a first lateral side and a second lateral side, said upper surface being concavely arcuate between said first lateral side and said second lateral side thereby facilitating said lower plate to conform to curvature of said inside surface of said outer wall of said barrel wherein said upper surface is configured to contain the burning fuel;
a first end plate being attached to said front side of said perimeter edge of said lower plate, said first end plate having an upper edge extending between said first lateral side and said second lateral side, said first end plate having a lower edge being co-arcuate with said upper surface; and
a second end plate being attached to said back side of said perimeter edge of said lower plate, said second end plate having an upper edge extending between said first lateral side and said second lateral side, said second end plate having a lower edge being co-arcuate with said upper surface, said second end plate having a plurality of holes each extending through a first surface and a second surface of said second end plate wherein each of said holes is configured to pass air onto the burning fuel to support combustion of the burning fuel.

3. The assembly according to claim 1, wherein:
each of said cooking panels has an opening extending through a top surface and a bottom surface of said cooking panel to accommodate the cooking pot; and
said assembly includes a plurality of support brackets, each of said support brackets being attached to a respective one of said cooking panels for supporting the cooking pot positioned on said respective cooking panel, each of said support brackets being aligned with said opening in said respective cooking panel.

4. The assembly according to claim 1, wherein:
said barrel has an opening extending through an outer wall of said barrel, said opening extending substantially between said rear end of said barrel and a forward end of said barrel, said barrel being oriented such that said opening faces upwardly;

each of said rollers includes a mount being attached to said outer wall of said barrel and a wheel rotatably coupled to a distal end of said mount with respect to said outer wall of said barrel, said plurality of rollers including a set of rear rollers and a set of front rollers, each of said rear rollers being positioned adjacent to said rear end of said barrel, each of said front rollers being positioned adjacent to said forward end of said barrel, said wheel associated with each of said front rollers being pivotally attached to said distal end of said mount associated with a respective one of said front rollers such that said wheel associated with each of said front rollers pivots about a vertical axis thereby facilitating said barrel to be steered;

said assembly includes a rear door being hingedly coupled to said rear end of said barrel for opening and closing said rear end, said rear door having a perimeter edge being continuously arcuate about a center point of said rear door such that said rear door has a circular shape, said perimeter edge being hingedly coupled to a bounding edge of said rear end at a hinge point located on said perimeter edge; and said assembly includes a pair of tracks, each of said tracks being attached to an inside surface of said outer wall of said barrel, each of said tracks extending between said rear end of said barrel and said forward end of said barrel, each of said tracks being positioned on opposite sides of said barrel with respect to each other, each of said tracks being spaced upwardly from a center of said barrel.

5. The assembly according to claim 4, wherein:

said cooking support comprises:

a panel having a top surface and a bottom surface, said panel being comprised of a rigid material wherein said panel is configured to support the food item, said panel being comprised of a heat resistant material wherein said panel is configured to be heated by the burning fuel; and a grill comprising a plurality of intersecting members being arranged to form a grid, said grill being bonded to said bottom surface of said panel having said grill completely covering said bottom surface; and said cooking support is slidable onto each of said tracks having said top surface of said panel resting on said tracks when said cooking support is positioned in a first orientation wherein said grill is configured to have the food item positioned thereon.

6. The assembly according to claim 4, further comprising a stove pipe being coupled to said barrel such that said stove pipe is in fluid communication with an interior of said barrel wherein said stove pipe is configured to exhaust smoke from the burning fuel from said barrel, said stove pipe is coupled to said forward end of said barrel, said stove pipe having a distal end with respect to said forward end, said stove pipe having a bend integrated into said stove pipe thereby defining an upright portion of said stove pipe extending upwardly along said forward end of said barrel such that said distal end of said stove pipe is elevated above said shell, said stove pipe having a diffuser being integrated into said distal end of said stove pipe for diffusing the exhaust smoke.

7. The assembly according to claim 4, further comprising a pull handle being coupled to said barrel thereby facilitating said pull handle to be gripped for transporting said barrel along the support surface, said pull handle comprising a central member extending between a pair of outward members, each of said outward members being coupled to said outer wall of said barrel having each of said outward members extending forwardly beyond said forward end of said barrel, each of said outward members bending upwardly at a point located adjacent to said central member thereby elevating said central member above the support surface for facilitating said central member to be gripped for transporting said barrel.

8. The assembly according to claim 4, wherein said table includes a first panel attached to said barrel and a second panel hingedly attached to said first panel, said first panel having a rear edge, a front edge and an upper surface extending between said rear edge and said front edge, said rear edge being coupled to said outer wall of said barrel, said second panel having a back edge and a top surface, said back edge being hingedly coupled to said front edge of said first panel, said top surface lying on a plane being oriented coplanar with said upper surface when said table is in said deployed position, said second panel extending downwardly from said first panel when said table is in said stored position.

9. The assembly according to claim 4, wherein:

said shell has a front end, a back end and an exterior wall extending between said front end and said back end, said exterior wall having a first edge and a second edge each extending between said front end and said back end, said exterior wall being concavely arcuate between said first edge and said second edge, each of said front end and said back end having a lower edge, said lower edge of each of said front end and said back end being concavely arcuate between said first edge and said second edge;

each of said first edge and said second edge is coupled to an outer surface of said exterior wall of said barrel such that said shell surrounds said opening in said outer wall of said barrel, said lower edge of each of said front end and said back end being coupled to said outer surface of said exterior wall of said barrel, said lower edge of each of said front end and said back end being aligned with a respective one of said rear end and said forward end of said barrel; and said entry extends through said exterior wall, said entry extending substantially between said front end and said back end.

10. The assembly according to claim 9, further comprising a temperature sensor being integrated into said shell, said temperature sensor being in thermal communication with an interior of said shell thereby facilitating said temperature sensor to detect a temperature of said interior of said shell, said temperature sensor including a gauge being positioned on said exterior wall of said shell for displaying the temperature of said interior of said shell.

11. The assembly according to claim 9, further comprising a top door being hingedly coupled to said shell, said top door being aligned with said entry for opening and closing said entry, said top door having a front edge and a rear edge, said top door being concavely arcuate between said front edge and said rear edge, said rear edge being hingedly coupled to a lateral side of a bounding edge of said entry.

12. The assembly according to claim 11, further comprising an opening handle being attached to said top door for opening and closing said top door, said opening handle including a middle member extending between a pair of sidelong members, each of said sidelong members being attached to and extending away from an outer surface of said top door having said middle member being spaced from and extending along said outer surface thereby facilitating said middle member to be gripped.

13. An outdoor cooking assembly for facilitating food to be cooked in a variety of methods, said assembly comprising:

a barrel having a rear end being open to access an interior of said barrel, said barrel being comprised of a heat resistant material thereby facilitating said barrel to contain a burning fuel, said barrel being oriented to extend along a horizontal axis, said barrel having an opening extending through an outer wall of said barrel, said opening extending substantially between said rear end of said barrel and a forward end of said barrel, said barrel being oriented such that said opening faces upwardly;

a plurality of rollers, each of said rollers being rotatably disposed on said barrel wherein said rollers are configured to roll along a support surface, each of said rollers including a mount being attached to said outer wall of said barrel and a wheel rotatably coupled to a distal end of said mount with respect to said outer wall of said barrel, said plurality of rollers including a set of rear rollers and a set of front rollers, each of said rear rollers being positioned adjacent to said rear end of said barrel, each of said front rollers being positioned adjacent to said forward end of said barrel, said wheel associated with each of said front rollers being pivotally attached to said distal end of said mount associated with a respective one of said front rollers such that said wheel associated with each of said front rollers pivots about a vertical axis thereby facilitating said barrel to be steered;

a rear door being hingedly coupled to said rear end of said barrel for opening and closing said rear end, said rear door having a perimeter edge being continuously arcuate about a center point of said rear door such that said rear door has a circular shape, said perimeter edge being hingedly coupled to a bounding edge of said rear end at a hinge point located on said perimeter edge;

a pair of tracks, each of said tracks being attached to an inside surface of said outer wall of said barrel, each of said tracks extending between said rear end of said barrel and said forward end of said barrel, each of said tracks being positioned on opposite sides of said barrel with respect to each other, each of said tracks being spaced upwardly from a center of said barrel;

a cooking support being slidable into said barrel thereby facilitating said cooking support to support a food item for cooking, said cooking support comprising:

a panel having a top surface and a bottom surface, said panel being comprised of a rigid material wherein said panel is configured to support the food item, said panel being comprised of a heat resistant material wherein said panel is configured to be heated by the burning fuel; and a grill comprising a plurality of intersecting members being arranged to form a grid, said grill being bonded to said bottom surface of said panel having said grill completely covering said bottom surface;

wherein said cooking support is slidable onto each of said tracks having said top surface of said panel resting on said tracks when said cooking support is positioned in a first orientation wherein said grill is configured to have the food item positioned thereon;

a fire pan being slidable into said barrel, said fire pan being comprised of a heat resistant material wherein said fire pan is configured to contain the burning fuel, said fire pan being positioned below said cooking panel when each of said fire pan and said cooking panel are positioned in said barrel thereby facilitating said cooking panel to be heated by the burning fuel wherein said fire pan is configured to facilitate said cooking panel to cook the food item, said fire pan comprising:

a lower plate having an upper surface and a perimeter edge, said perimeter edge having a front side, a back side, a first lateral side and a second lateral side, said upper surface being concavely arcuate between said first lateral side and said second lateral side thereby facilitating said lower plate to conform to curvature of said inside surface of said outer wall of said barrel wherein said upper surface is configured to contain the burning fuel;

a first end plate being attached to said front side, said first end plate having an upper edge extending between said first lateral side and said second lateral side, said first end plate having a lower edge being co-arcuate with said upper surface; and a second end plate being attached to said back side, said second end plate having an upper edge extending between said first lateral side and said second lateral side, said second end plate having a lower edge being co-arcuate with said upper surface, said second end plate having a plurality of holes each extending through a first surface and a second surface of said second end plate wherein each of said holes is configured to pass air onto the burning fuel to support combustion of the burning fuel;

a shell being attached to and curving upwardly from said barrel, said shell being in fluid communication with an interior of said barrel wherein said shell is configured to contain heat produced by the burning fuel in said fire pan, said shell having an entry extending through said shell for accessing said cooking support, said shell having a front end, a back end and an exterior wall extending between said front end and said back end, said exterior wall having a first edge and a second edge each extending between said front end and said back end, said exterior wall being concavely arcuate between said first edge and said second edge, each of said front end and said back end having a lower edge, said lower edge of each of said front end and said back end being concavely arcuate between said first edge and said second edge, each of said first edge and said second edge being coupled to an outer surface of said exterior wall of said barrel such that said shell surrounds said opening in said outer wall of said barrel, said lower edge of each of said front end and said back end being coupled to said outer surface of said exterior wall of said barrel, said lower edge of each of said front end and said back end being aligned with a respective one of said rear end and said forward end of said barrel, said entry extending through said exterior wall, said entry extending substantially between said front end and said back end;

a top door being hingedly coupled to said shell, said top door being aligned with said entry for opening and closing said entry, said top door having a front edge and a rear edge, said top door being concavely arcuate between said front edge and said rear edge, said rear edge being hingedly coupled to a lateral side of a bounding edge of said entry;

a stove pipe being coupled to said barrel such that said stove pipe is in fluid communication with an interior of said barrel wherein said stove pipe is configured to exhaust smoke from the burning fuel from said barrel, said stove pipe being coupled to said forward end of said barrel, said stove pipe having a distal end with respect to said forward end, said stove pipe having a bend integrated into said stove pipe thereby defining an upright portion of said stove pipe extending upwardly along said forward end of said barrel such that said distal end of said stove pipe is elevated above said shell, said stove pipe having a diffuser being integrated into said distal end of said stove pipe for diffusing the exhaust smoke;

a pull handle being coupled to said barrel thereby facilitating said pull handle to be gripped for transporting said barrel along the support surface, said pull handle comprising a central member extending between a pair of outward members, each of said outward members being coupled to said outer wall of said barrel having each of said outward members extending forwardly beyond said forward end of said barrel, each of said outward members bending upwardly at a point located adjacent to said central member thereby elevating said central member above the support surface for facilitating said central member to be gripped for transporting said barrel;

a temperature sensor being integrated into said shell, said temperature sensor being in thermal communication with an interior of said shell thereby facilitating said temperature sensor to detect a temperature of said interior of said shell, said temperature sensor including a gauge being positioned on said exterior wall of said shell for displaying the temperature of said interior of said shell;

a table being movably disposed on said barrel, said table being positionable between a deployed position and a stored position, said table including a first panel attached to said barrel and a second panel hingedly attached to said first panel, said first panel having a rear edge, a front edge and an upper surface extending between said rear edge and said front edge, said rear edge being coupled to said outer wall of said barrel, said second panel having a back edge and a top surface, said back edge being hingedly coupled to said front edge of said first panel, said top surface lying on a plane being oriented coplanar with said upper surface when said table is in said deployed position, said second panel extending downwardly from said first panel when said table is in said stored position; and an opening handle being attached to said top door for opening and closing said top door, said opening handle including a middle member extending between a pair of sidelong members, each of said sidelong members being attached to and extending away from an outer surface of said top door having said middle member being spaced from and extending along said outer surface thereby facilitating said middle member to be gripped.

* * * * *